United States Patent [19]
Furihata et al.

[11] Patent Number: 5,526,126
[45] Date of Patent: Jun. 11, 1996

[54] SIGNAL PROCESSOR FOR VTR WHICH CONVERTS COLOR UNDER SIGNALS TO COLOR SIGNALS

[75] Inventors: Makoto Furihata, Maebashi; Takashi Jin; Kenya Yamauchi, both of Takasaki; Shinichi Ishihara, Isesaki; Kouichi Yamazaki, Maebashi, all of Japan

[73] Assignees: Hitachi, Ltd., Tokyo; Hitachi Tohbu Semiconductor, Ltd., Saitama; Hitachi Microcomputer System Ltd., Tokyo, all of Japan

[21] Appl. No.: 258,953

[22] Filed: Jun. 13, 1994

[30] Foreign Application Priority Data

Jun. 25, 1993 [JP] Japan ................................ 5-155862
Nov. 24, 1993 [JP] Japan ................................ 5-318986

[51] Int. Cl.[6] ....................................................... H04N 9/79
[52] U.S. Cl. ........................... 358/328; 358/330; 358/327; 348/607; 348/609; 348/612
[58] Field of Search ....................... 358/328, 327, 358/330, 310; 348/607, 609, 612; H04N 9/79, 9/793

[56] References Cited

U.S. PATENT DOCUMENTS

| | | | |
|---|---|---|---|
| 4,969,033 | 11/1990 | Yamada et al. | 358/328 |
| 5,083,213 | 1/1992 | Yasuda et al. | 358/328 |
| 5,091,788 | 2/1992 | Matsuo et al. | 358/328 |

FOREIGN PATENT DOCUMENTS

| | | |
|---|---|---|
| 57-129086 | 8/1982 | Japan. |
| 63-39297 | 2/1988 | Japan. |
| 63-226192 | 9/1988 | Japan. |
| 63-257394 | 10/1988 | Japan. |
| 1-60183 | 3/1989 | Japan. |
| 1-132292 | 5/1989 | Japan. |
| 2-33293 | 2/1990 | Japan. |
| 2-51489 | 4/1990 | Japan. |
| 3-226094 | 10/1991 | Japan. |

*Primary Examiner*—Tommy P. Chin
*Assistant Examiner*—Khoi Truong
*Attorney, Agent, or Firm*—Fay, Sharpe, Beall, Fagan, Minnich & McKee

[57] ABSTRACT

A first reproduced color under signal is delayed by one or two horizontal periods by a delay circuit, and this delayed second reproduced color under signal and the aforementioned first reproduced color under signal have their frequencies converted individually by first and second frequency converters into standard color signals. An oscillatory frequency signals of 2n of carriers for the aforementioned frequency conversions are divided to have the aforementioned carrier frequencies and to produce four carriers having phases of 0, 90, 180 and 270 degrees. These carriers are selectively fed to the first and second frequency converters by switches so that the two frequency-converted signals are subtracted or added in phase or in opposite phase to clear the noise (or crosstalk component), which is caused by the crosstalk between the tracks.

4 Claims, 10 Drawing Sheets

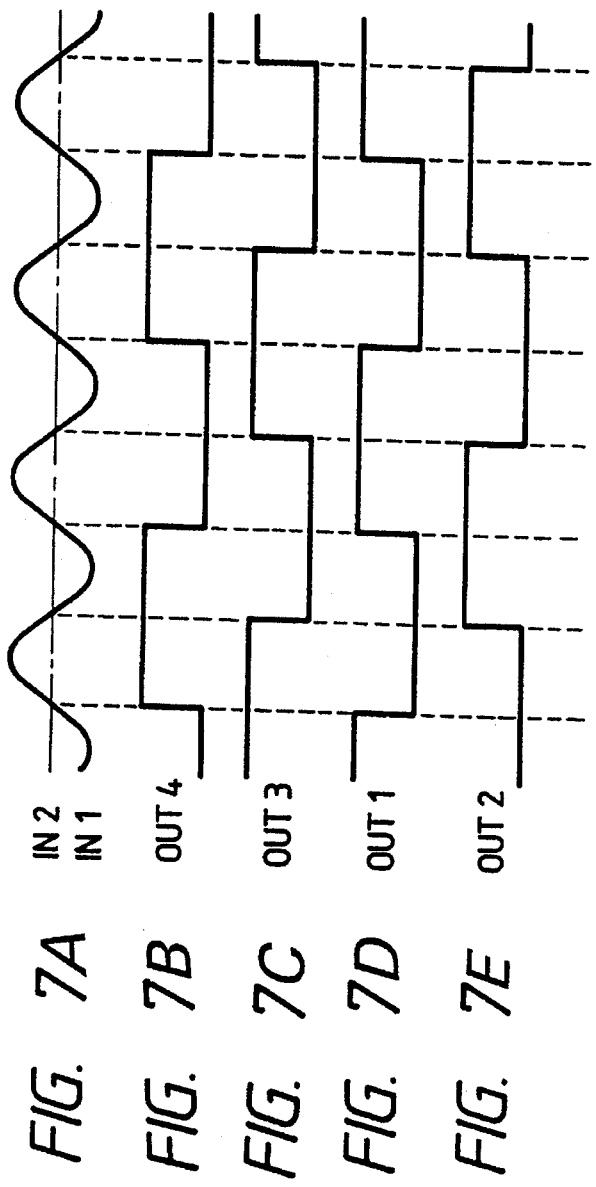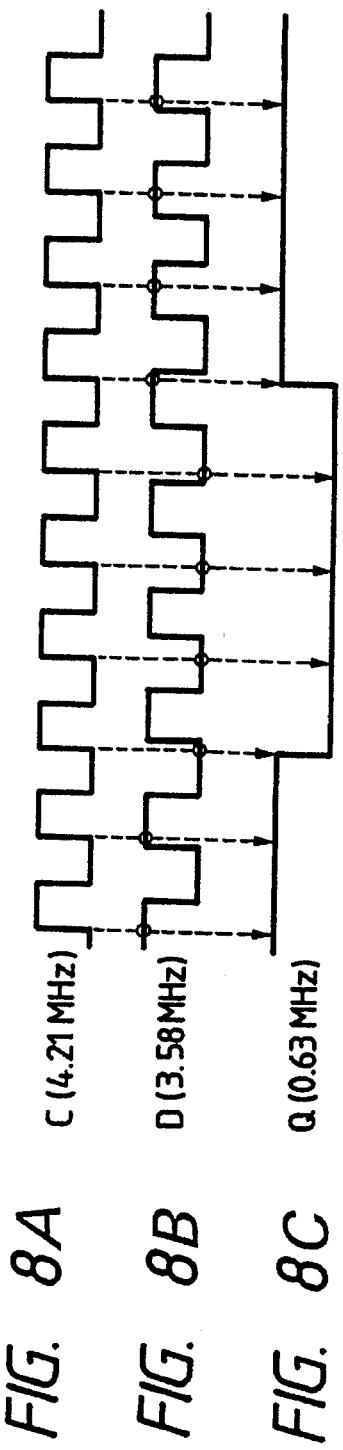
FIG. 7A IN 2 IN 1
FIG. 7B OUT 4
FIG. 7C OUT 3
FIG. 7D OUT 1
FIG. 7E OUT 2
FIG. 8A C (4.21 MHz)
FIG. 8B D (3.58 MHz)
FIG. 8C Q (0.63 MHz)

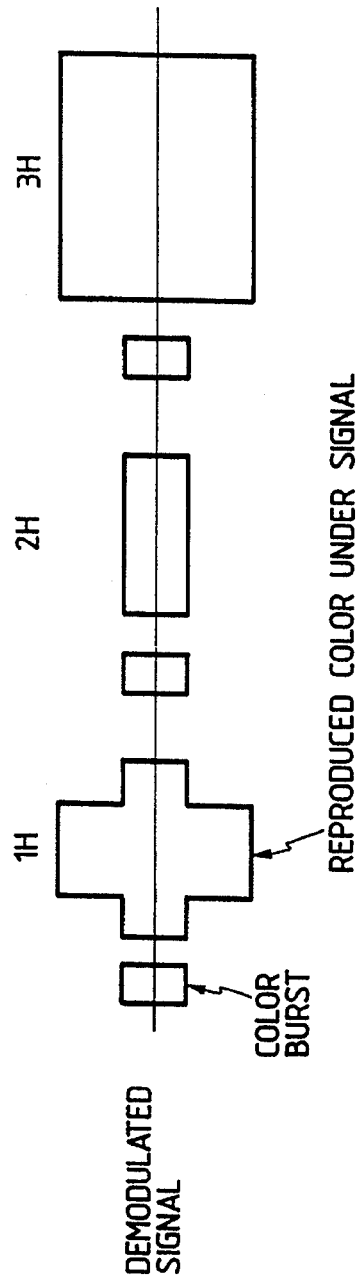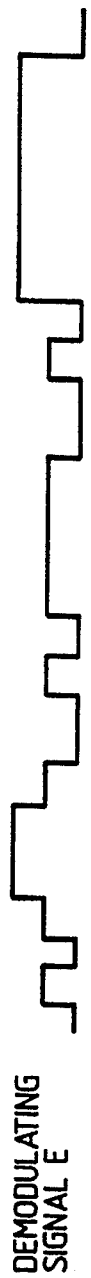

SIGNAL PROCESSOR FOR VTR WHICH CONVERTS COLOR UNDER SIGNALS TO COLOR SIGNALS

BACKGROUND OF THE INVENTION

The present invention relates to a signal processor for a VTR (which is abbreviated from Video Tape Recorder as in the following) and, more particularly, to a technique which is effective if applied to a frequency converter for converting the reproduced video signals of a color under system such as the VHS, S-VHS or 8 mm video system into standard color signals.

In the home VTR, color video signals are recorded by the color under system. In this system, the luminance signals are frequency-modulated, and the color signals are frequency-converted to a lower frequency band than that of the frequency-modulated luminance signals and are recorded on the inclined track of a magnetic tape by a rotary video head.

The VTR of recent years uses the guard bandless system for a higher density and is essentially required to clear a noise (as will be called the "crosstalk component") caused by a crosstalk. The clearance of this crosstalk component is effected by giving an azimuth angle to the video head, and this azimuth angle is effective highly for high-frequency signals but lowly for low-frequency signals. In other words, the clearance of the crosstalk component is little effective for the color signals, and the phase shift system (i.e., the PS system) or the phase invert system (i.e., the PI system) is adopted for the effect.

A method of clearing the crosstalk component in the color under system will be described by using the NTSC format of the VHS system. The video recording track is recorded by alternating two tracks, i.e., Channel 1 and Channel 2. In the NTSC format of the VHS system, the color under frequency is set to forty times (40 $f_H$) as high as the horizontal scanning frequency $f_H$ ($f_H$=15.734 KHz). As a result, the standard color signals are recorded by converting their sub-carrier frequency of 3.579545 MHz into 40 $f_H$, i.e., about 629 KHz. At this time, the phases are advanced for one horizontal period (1 H) by 90 degrees in Channel 1 and delayed by 90 degrees in Channel 2. This is because when the reproduced color under signal of 629 KHz is inversely converted at a playing time to 3.579545 MHz (while the phases are also returned), the reproduced color under signals delayed by one horizontal period (1 H) can be added to clear the crosstalk components by using a delay element of one horizontal period (1 H) and by using the reproduced color under signals before delayed and the delay element.

The frequency conversion technique we have investigated before our invention is shown in FIG. 12, FIG. 13 and FIG. 14. In FIGS. 12 and 13, the crosstalk component is cleared by converting the reproduced color under signals into the standard color signals of 3.579545 MHz with a main converter and then by delaying the standard color signals by one horizontal period (1 H) with a glass delay line or a CCD (i.e., Charge Coupled Device as in the following). In FIG. 14, the phase adjustment is omitted by delaying the low-pass reproduced color under signals by one horizontal period (1 H) or two horizontal periods (2 H) in the low frequency with the CCD and by adding it to or subtracting it from the reproduced color under signals before delayed.

The aforementioned frequency conversion technique is exemplified by Japanese Patent Laid-Open No. 257394/1988 or 51489/1990.

SUMMARY OF THE INVENTION

The aforementioned method using the glass delay line, as shown in FIG. 12, is defective in that the glass delay line is a part relatively large to be packaged and expensive in price. As shown in FIG. 13, on the other hand, the method using the CCD has to operate at a clock three or four times as high as 3.579545 MHz of the sub-carriers, and a phase adjustment is required for adjusting the total delay of the CCD and a low-pass filter or a band-pass filter necessary downstream of the CCD accurately to one horizontal period (1 H). This phase adjustment has to be several degrees or less with respect to the accuracy of the sub-carrier frequency of 3.579545 MHz. The method of FIG. 14 can be practiced by an inexpensive CCD having a low clock frequency. Since, however, the reproduced color under signals are phase-shifted or phase-inverted, a phase corrector for eliminating the phase difference is necessary downstream of the CCD to make it difficult to realize the aforementioned phase corrector for effecting a highly accurate phase correction. These facts have been clarified by our investigations.

An object of the present invention is to provide a signal processor for a VTR, which can convert a reproduced frequency while clearing a crosstalk component by a simple construction.

Another object of the present invention is to provide a VTR signal processor which can have a simple construction and automatically eliminate the amplitude level difference (or gain dispersion) between the reproduced color under signal produced due to the element dispersion of the aforementioned delay circuit or the like and the delayed reproduced color under signal.

The foregoing and other objects and novel features of the present invention will become apparent from the following description to be made with reference to the accompanying drawings.

A representative of the invention to be disclosed herein will be briefly summarized in the following. Specifically, a first reproduced color under signal is delayed by one or two horizontal periods (1 H or 2 H) by a delay circuit, and this delayed second reproduced color under signal and the aforementioned first reproduced color under signal have their frequencies converted individually by first and second frequency converters into standard color signals. An oscillatory frequency signals of 2n of carrier frequency for the aforementioned frequency conversions are divided to have the aforementioned carrier frequencies and to produce four carriers having phases of 0, 90, 180 and 270 degrees. These carriers are selectively fed to the aforementioned first and second frequency converters by switches so that the two frequency-converted signals are subtracted or added in phase or in opposite phase to clear the crosstalk component from between the tracks.

According to the above-specified means, the clock Frequency of the delay circuit of the CCD or the like for delaying the reproduced color under signals can be lowered and simplified, and it is possible to automatically eliminate the amplitude level difference (or gain dispersion) between the reproduced color under signal produced due to the element dispersion of the aforementioned delay circuit or the like and the delayed reproduced color under signal.

Since, moreover, the four signals having their phases delayed by 90 degrees can be produced by the aforementioned frequency divider, the output signals of two frequency converters 3 and 4 can have their phases adjusted by feeding the four signals selectively to the frequency converters 3 and 4 in response to the reproduced color under signals inputted, so that the crosstalk component can be eliminated by making an addition or subtraction by an arithmetic circuit.

BRIEF DESCRIPTION OF THE DRAWINGS

FIGS. 7A–7E are a waveform chart for explaining the operations of the frequency divider of FIG. 6;

FIGS. 8A–8C are a waveform chart for explaining the frequency subtracting operations of FIG. 5;

FIGS. 11A–11C are a schematic waveform chart illustrating the inputs and outputs of the demodulators of FIG. 1;

DESCRIPTION OF THE PREFERRED EMBODIMENTS

Figure 1:
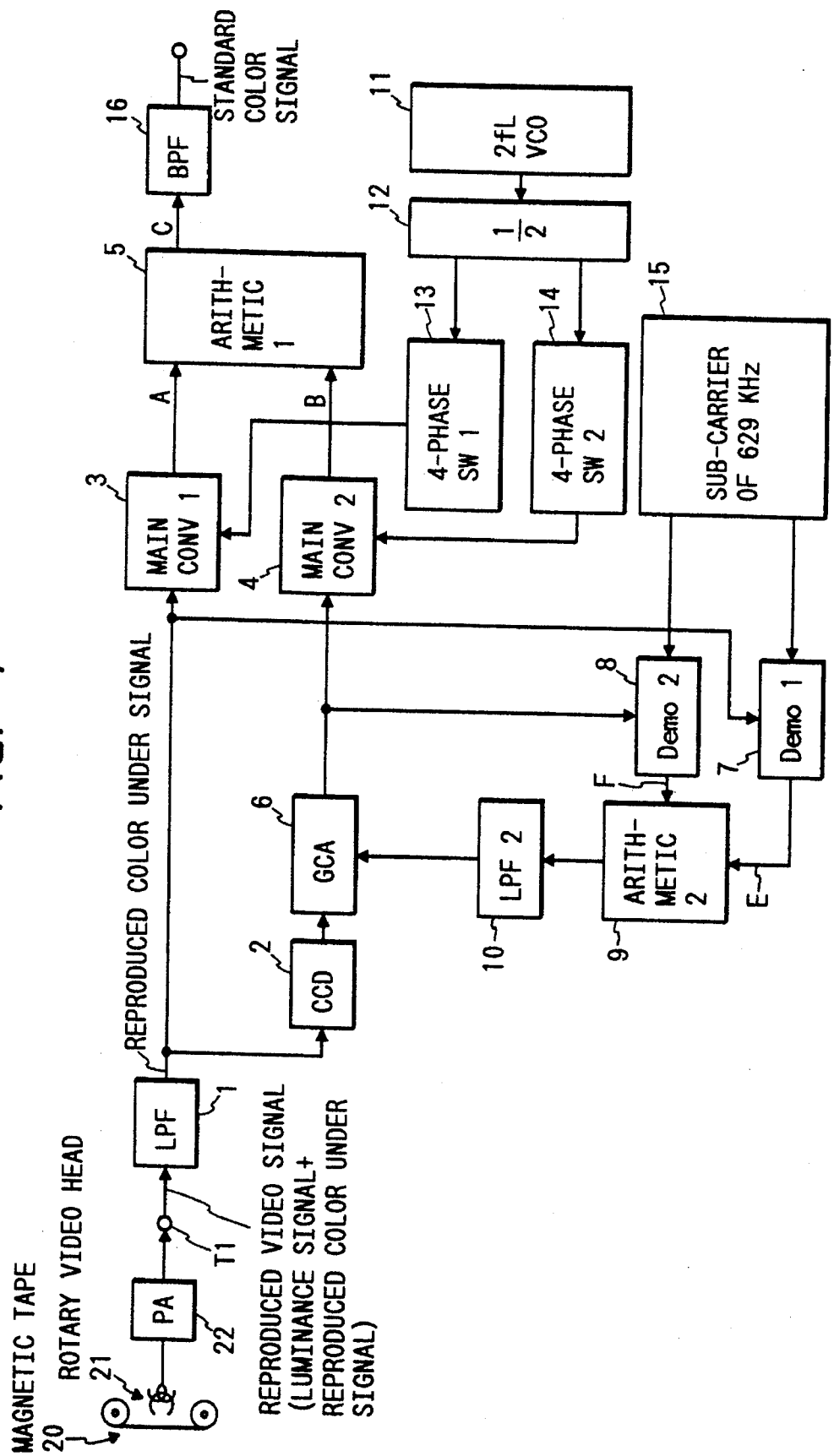
FIG. 1 is a block diagram showing one embodiment of the frequency conversion unit to be incorporated into the VTR signal processor according to the present invention.

FIG. 1 is a block diagram showing one embodiment of a frequency conversion unit to be incorporated into a VTR signal processor according to the present invention. The circuit block of FIG. 1 is formed together with other circuit blocks composing the VTR signal processor over a single semiconductor substrate of single-crystalline silicon by the well-known technique of manufacturing a semiconductor integrated circuit.

In FIG. 1, reference numeral 22 designates a preamplifier (PA) for amplifying the signals which are read out of a magnetic tape 20 by a rotary video head 21. The signals thus amplified by the aforementioned preamplifier are fed as reproduced video signals through a terminal T1 to a low-pass filter (LPF) 1. This low-pass filter (LPF) 1 extracts a color signal from the reproduced video signals outputted from the aforementioned preamplifier (PA) 22. Numeral 2 designates a delay signal for one horizontal period (1 H) or two horizontal periods (2 H). This delay circuit 2 may be composed of not only a CCD but also an input portion for analog/digital conversion, a shift register for the delay, and a digital/analog converter for returning the shifted digital signal to an analog signal. Numeral 3 designates a first frequency converter for converting the reproduced color under signal before delayed into the frequency of a standard color signal. Numeral 4 designates a second frequency converter, i.e., the so-called "main converter" for converting the reproduced color under signal delayed by the aforementioned delay circuit 2 into the frequency of a standard color signal. Numeral 5 designates an arithmetic circuit (for Arithmetic 1) for clearing a crosstalk component from the output signals of the frequency converters 3 and 4.

The aforementioned reproduced video signal is fed to the low-pass filter 1 for separating it from a luminance signal. In response to the reproduced video signal, the low-pass filter 1 outputs the reproduced color under signal. This reproduced color under signal is delayed on one hand by one horizontal period (1 H) and is guided through a gain controller (i.e., GCA) 6 to the second frequency converter (Main Conv2) 4. On the other hand, the reproduced color under signal having passed through the aforementioned low-pass filter 1 is guided as it is into the first frequency converter (Main Conv1) 3.

The color signals thus having their frequencies converted by the aforementioned first and second frequency converters 3 and 4 are fed to the arithmetic circuit S for clearing the crosstalk component. By additionally providing a band-pass filter (i.e., BPF) 16, the unnecessary frequency components produced by the first and second frequency converters 3 and 4 can be cleared to produce clear standard color signals.

The frequency converting sub-carrier is produced, if in the NTSC mode for the two times of the subcarrier, by halving the output signal of an oscillator (2 fL VCO) 11 oscillating at about 4.21 MHz×2=8.42 MHz and is fed through four-phase switches 13 and 14 (4-phase SW1 and 4-phase SW2) acting as switching circuits to the corresponding first and second frequency converters 3 and 4.

The reproduced color under signal inputted to the first frequency converter 3 and the reproduced color under signal inputted to the second frequency converter 4 and delayed by one horizontal period (1 H) are inputted to demodulators (Demo1 and Demo2) 7 and 8, respectively, so that their amplitude levels may be equalized. In these demodulators 7 and 8, demodulated signals of base band are produced by using the sub-carrier which has its frequency synchronized with the burst signal of the reproduced color under signal fed from a sub-carrier generator 15. The demodulated signals are fed through an arithmetic circuit (Arithmetic 2) 9 for establishing the amplitude difference of the demodulated base bands and are converted into DC voltages by a low-pass filter (LPF2) 10, and the reproduced color under signal inputted to the first frequency converter 3 and the reproduced color under signal inputted to the second frequency converter 4 and delayed by one horizontal period (1 H) have their amplitude levels equalized by controlling the aforementioned gain controller (GCA) 6.

The oscillator 11 oscillates at a frequency of 2n×fL (fL: the sub-carrier frequency) for producing a sub-carrier for frequency conversion, and the frequency divider 12 divides the frequency of the frequency of the oscillator 11 into the frequency of the subcarriers, although not especially limited thereto, and produces of sub-carriers of four phases of 0, 90, 180 and 270 degrees. The aforementioned 4-phase sub-carriers are individually fed to the aforementioned 4-phase switches 13 and 14.

Figure 2:
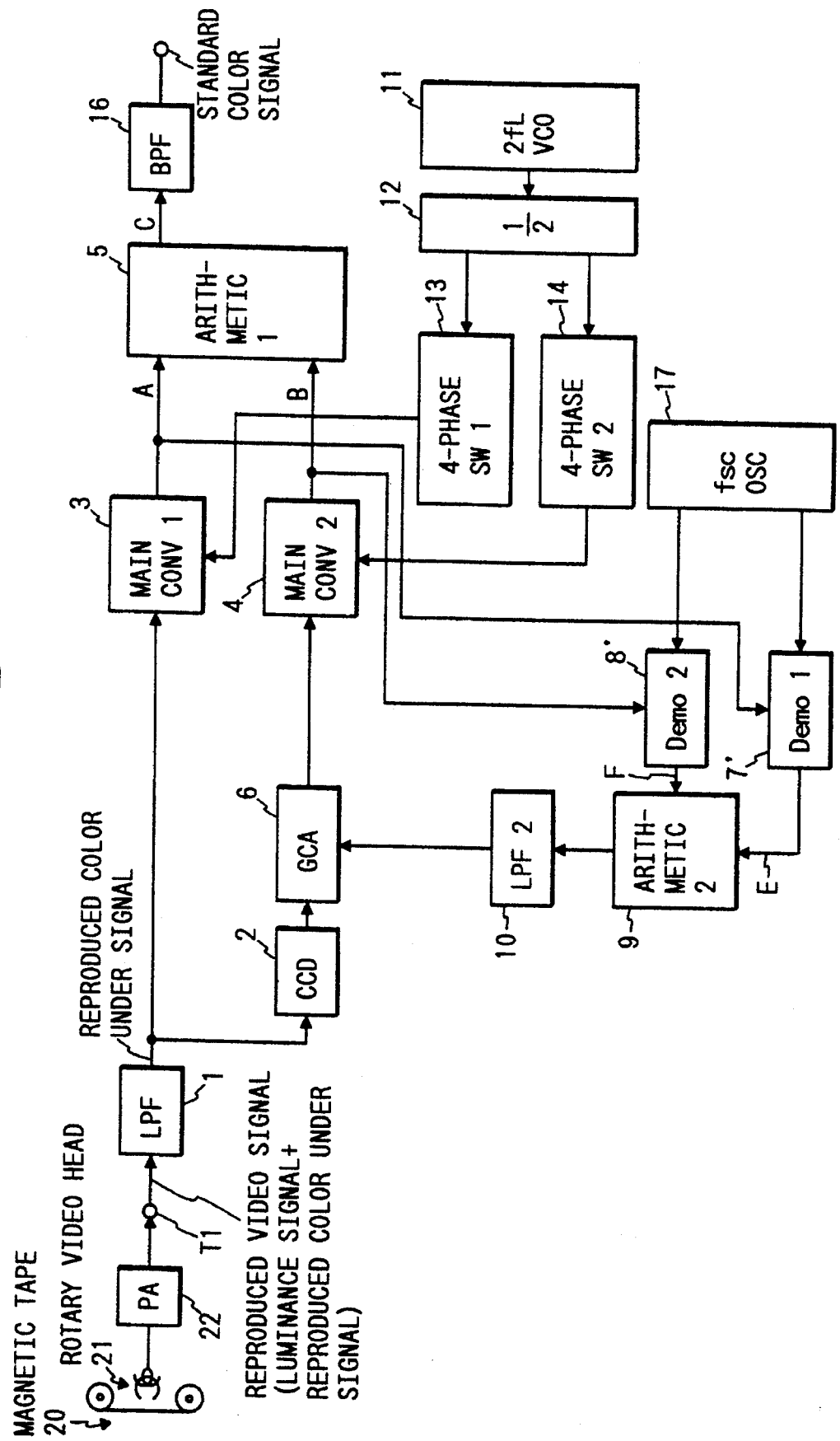
FIG. 2 is a block diagram showing another embodiment of the frequency conversion unit to be incorporated into the VTR signal processor according to the present invention.

FIG. 2 is a block diagram showing another embodiment of the frequency conversion unit to be incorporated into a VTR signal processor according to the present invention. In this embodiment, the color signal having its frequency converted by the first frequency converter 3 and the color signal having its frequency converted by the second frequency converter 4 are inputted to demodulators (Demo1 and Demo2) 7' and 8' so that their amplitude levels may be equalized. These demodulators 7' and 8' perform the demodulations to produce color signals with the frequency-converted color signals and the color carrier (fsc) produced by the oscillator 17. These color signals are fed through the arithmetic circuit 9 for establishing their amplitude difference and are converted into DC voltages by the low-pass filter (LPF2) 10 so that they may be used for controlling the gain controller (GCA) 6. As a result, a level adjustment is carried out to equalize the color signal outputted from the second frequency converter 4 and the color signal outputted from the first frequency converter 3 so that the crosstalk component can be cleared by the additions or subtractions, as will be described hereinafter.

Figure 3A:
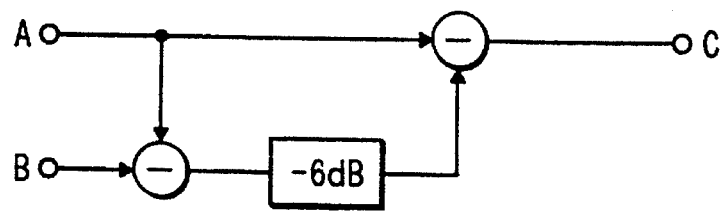
FIG. 3A is a schematic diagram showing a first embodiment of the arithmetic circuit for clearing the crosstalk component.
Figure 3B:
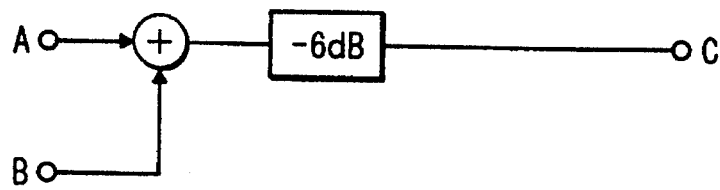
FIG. 3B a schematic diagram showing a second embodiment of the arithmetic circuit for clearing the crosstalk component.

FIGS. 8A and 3B are schematic diagrams showing one embodiment of the arithmetic circuit for clearing the aforementioned crosstalk component. FIGS. 3A and 3B shows the case, in which A signal and B signal are in phase if the aforementioned color signal outputted from the aforementioned first frequency converter 3 is called the A signal whereas the aforementioned color signal outputted from the aforementioned second second frequency converter 4 is called the B signal. In FIG. 3A, the crosstalk component is cleared from the A signal by subtracting the B signal from the A signal to extract a double crosstalk component, by attenuating it by −6 dB, i.e., by halving its level to return it to the crosstalk component, and by subtracting it from the A signal.

In FIG. 3B, the crosstalk components in opposite phase are offset by adding the A signal and the B signal. By this addition, the signal component is doubled so that the initial signal level is restored even by the attenuation of −6 dB.

Figure 4A:
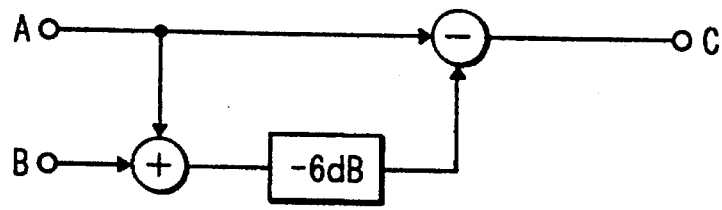
FIG. 4A a schematic diagram showing a third embodiment of the arithmetic circuit for clearing the crosstalk component.
Figure 4B:
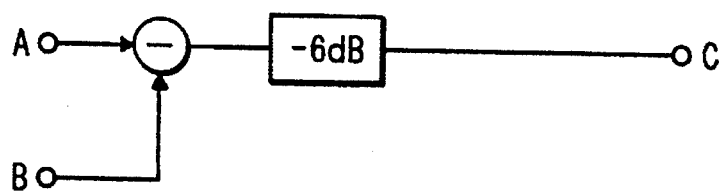
FIG. 4B a schematic diagram showing a fourth embodiment of the arithmetic circuit for clearing the crosstalk component.

FIGS. 4A and 4B are schematic diagrams showing another embodiment of the arithmetic circuit for clearing the aforementioned crosstalk component. FIGS. 4A and 4B show the case, in which A signal and B signal are in opposite phases if the aforementioned color signal outputted from the aforementioned first frequency converter 3 is called the A signal whereas the aforementioned color signal outputted from the aforementioned second second frequency converter 4 is called the B signal. In FIG. 4A, the crosstalk component is cleared from the A signal by adding the A signal and the B signal to extract a double crosstalk component, by attenuating it by −6 dB, i.e., by halving its level to return it to the crosstalk component, and by subtracting it from the A signal.

In FIG. 4B, the crosstalk components in phase are offset by subtracting the B signal from the A signal. By this subtraction, the signal component in opposite phase is doubled so that the initial signal level is restored even by the attenuation of −6 dB.

Figure 9:
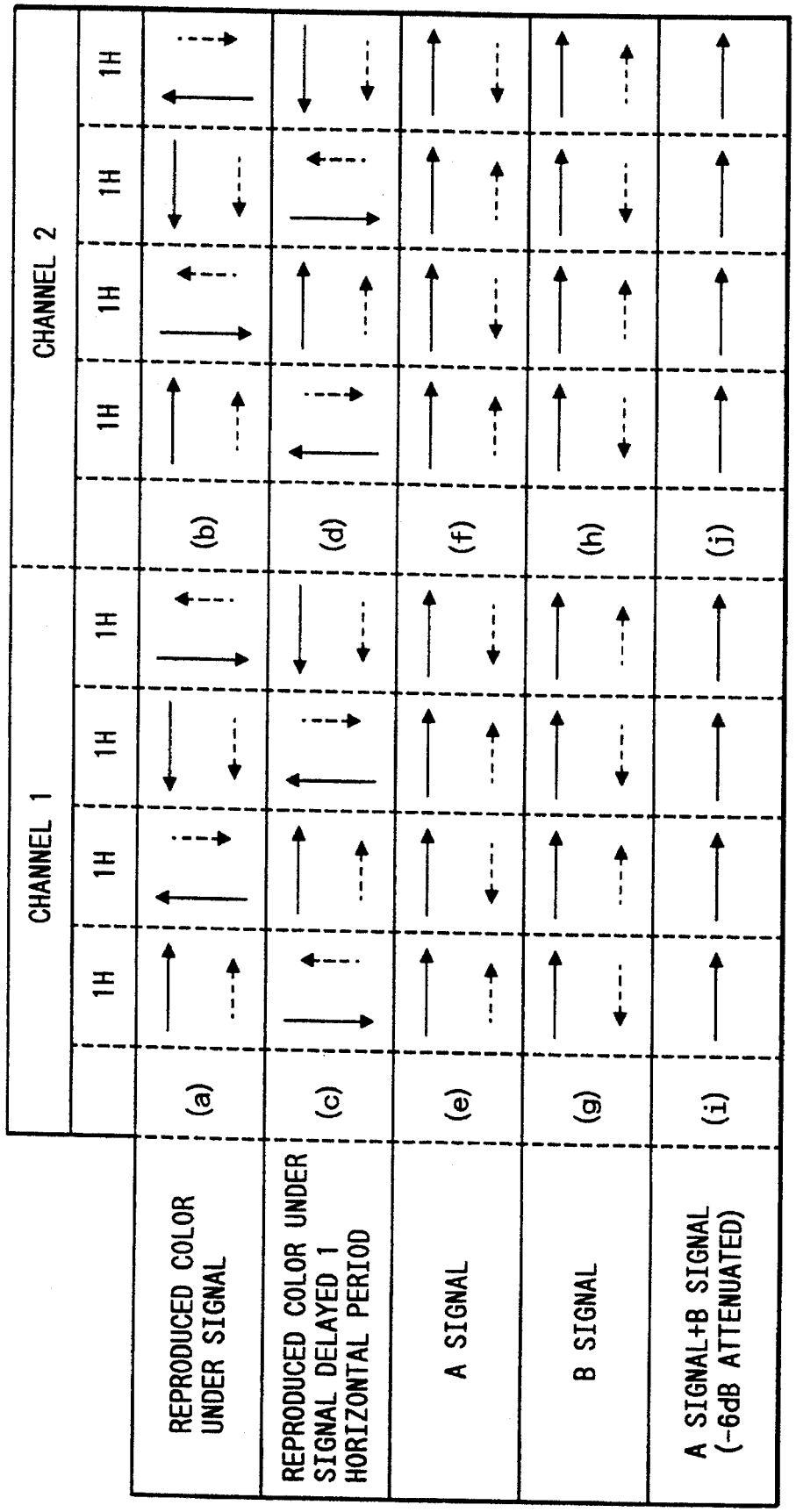
FIG. 9 is a phase shift diagram showing the reproduced color under signals in the NTSC format of the VHS system.

FIG. 9 is a phase shift diagram enumerates reproduced color under signals in the NTSC format of the VHS system, that is, the color signals (i.e., the A signal and the B signal) having their frequencies converted by the aforementioned two frequency converters 3 and 4 and the aforementioned standard color signals. In FIG. 9: (a) enumerates the phase of the reproduced color under signal of Channel 1; (b) the phase of the reproduced color under signal of Channel 2; (c) the phase of the reproduced color under signal of (a) of Channel 1 after delay of one horizontal period (1 H); and (d) the phase of the reproduced color under signal of (b) of Channel 2 after delay of one horizontal period (1 H). Solid lines indicate signal components, and broken lines indicate crosstalk components.

These reproduced color under signals are inputted to have their frequencies converted by the two, i.e., first and second frequency converters 3 and 4. At this time, the converting sub-carrier (fsc+40 $f_H$=4.21 MHz) is produced by dividing the frequency signal of the sub-carrier oscillator 11 which will oscillates at a frequency of 2n times as high as those of the sub-carriers. These sub-carriers of four phases are fed to the first and second frequency converters by the switches 13 and 14. The phases of the sub-carriers fed at this time to the switches 13 and 14 are set to return the phase shifts at the recording time. Specifically, the phase is advanced in Channel 1 by 90 degrees for each horizontal period (1 H) and is delayed in Channel 2 by 90 degrees for each horizontal period (1 H).

In the present invention, the phase of the subcarrier of the second frequency converter 4 is delayed by 90 degrees in Channel 1 and advanced by 90 degrees in Channel 2 from the sub-carrier phase of the first frequency converter 3. The phases of 3.579545 MHz converted by those first and second frequency converters 3 and 4 are enumerated in (e), (f), (g) and (h).

The phase (i) is obtained in Channel 1 by adding the phases (e) and (g) by the adder of the arithmetic circuit 5, and the phase (j) is obtained in Channel 2 by adding the phases (f) and (h). In these phases (i) and (j), the crosstalk components, as indicated by broken lines, can be cleared to produce the standard color signals having their frequencies converted. Incidentally, the mere addition would double the signal level, and the added output has to be attenuated by −6 dB, as shown in FIGS. 3A and 3B. Moreover, the crosstalk components can also be cleared, as described above, by using a subtracter. Incidentally, in Channel 1, the frequency conversion may be started from any of the four phases, as shown at (a). If the frequency conversion is started from the phase which is indicated by an upward solid arrow (but the crosstalk component is indicated by a downward broken arrow), for example, all the rightward arrows (or phases), as shown at (i), take the upward arrows in the same direction. This discussion can apply to Channel 2.

Figure 10:
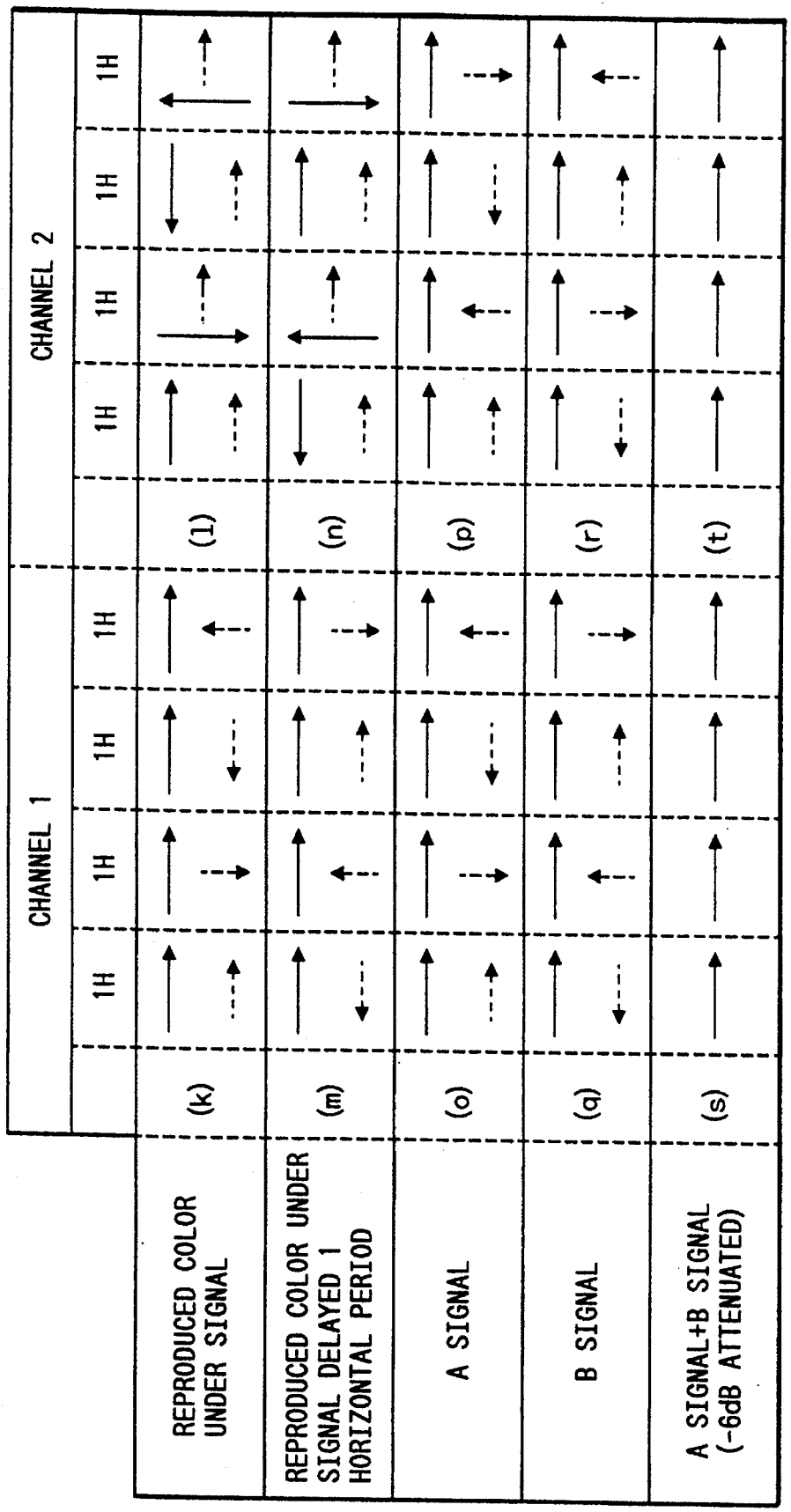
FIG. 10 is a phase shift diagram showing the reproduced color under signals in the PAL format of the VHS system.
Figure 12:
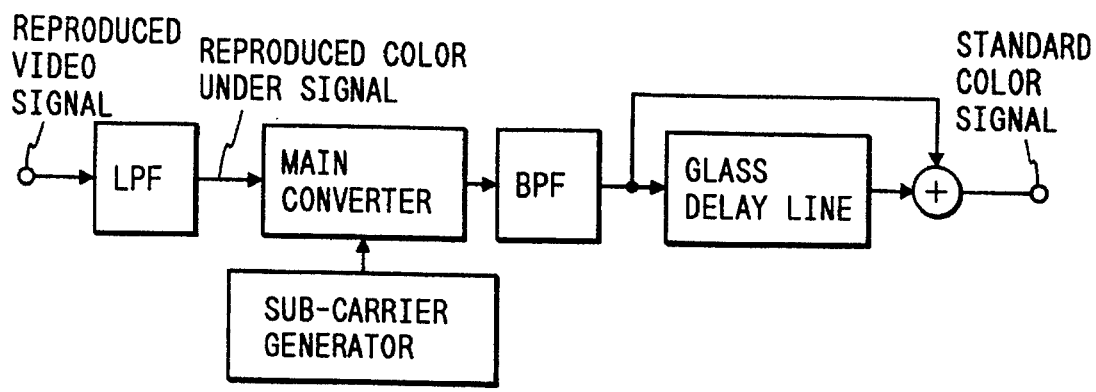
FIG. 12 is a block diagram showing one example of the technique we have investigated.
Figure 13:
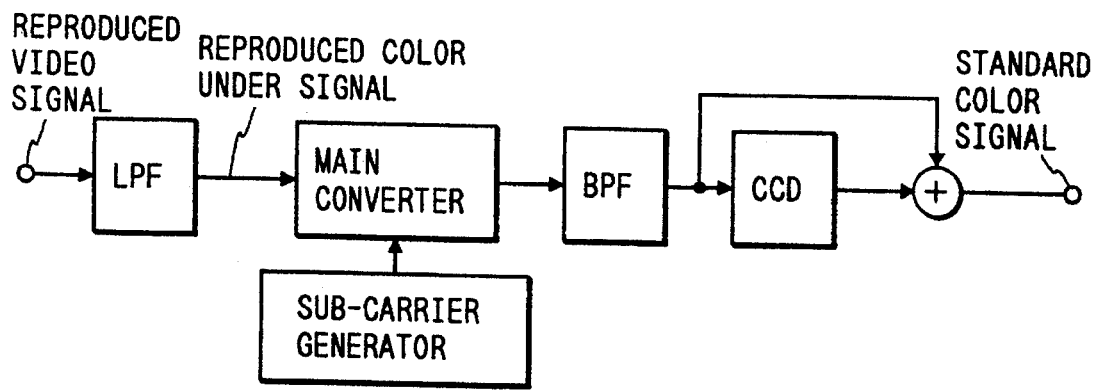
FIG. 13 is a block diagram showing another example of the technique we have investigated.
Figure 14:
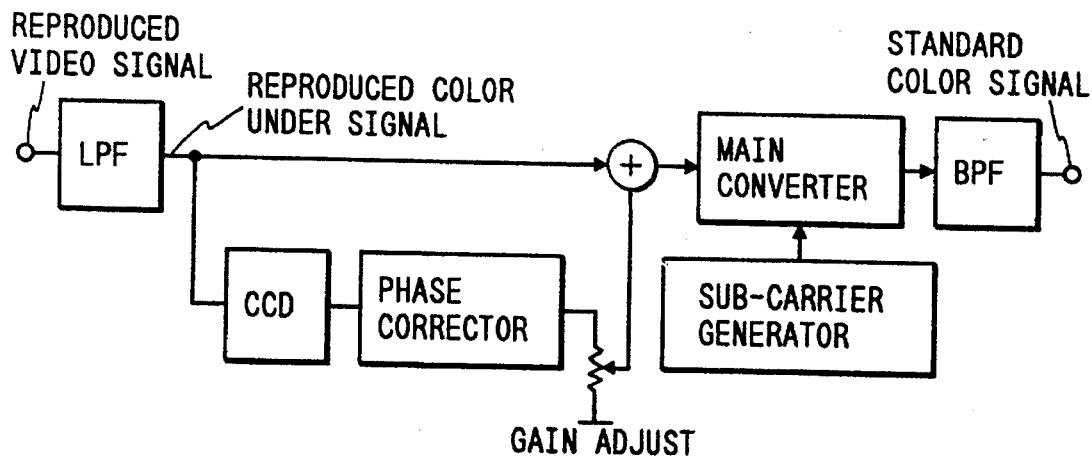
FIG. 14 is a block diagram showing still another example of the technique we have investigated.

FIG. 10 is a phase shift diagram enumerates reproduced color under signals in the PAL format of the VHS system, that is, the color signals (i.e., the A signal and the B signal) having their frequencies converted by the aforementioned two frequency converters 3 and 4 and the aforementioned standard color signals.

In FIG. 10, too, solid lines indicate signal components, and broken lines indicate crosstalk components. (k) enumerates the phase of the reproduced color under signal of Channel 1; (l) the phase of the reproduced color under signal of Channel 2; (m) the phase of the reproduced color under signal of (k) of Channel 1 after delay of two horizontal periods (2 H); and (n) the phase of the reproduced color signal of (l) of Channel 2 after delay of two horizontal periods (2 H).

These reproduced color under signals are inputted to have their frequencies converted by the two, i.e., first and second frequency converters 3 and 4. At this time, the phase of the converting sub-carrier (fsc+40.125 $f_H$=5.06 MHz) is set to return the return the phase shifts at the recording time to the original ones. Specifically, the phase is set in Channel 1 to the same phase and is delayed in Channel 2 by 90 degrees for each horizontal period.

In the present invention, the phase of the sub-carrier of the second frequency converter 4 is set in Channel 1 to the same phase as that of the frequency converter 3 and is advanced by 180 degrees in Channel 2 from the same. The phases of 4.433618 MHz converted by those first and second frequency converters 3 and 4 are enumerated in (o), (p), (q) and (r). In the arithmetic circuit 5, the phase (s) is obtained in Channel 1 by adding the output signals (o) and (q), and the phase (t) is obtained in Channel 2 by adding the output signals (p) and (r). For the signals (s) nd (t), the crosstalk components can be eliminated to produce the frequency-converted standard color signals. Like above, the mere addition would double the signal level, and the added output has to be attenuated by −6 dB, as shown in FIGS. 3A and 3B. Moreover, the crosstalk components can also be cleared, as described above, by using a subtracter. Incidentally, in Channel 1, the frequency conversion may be started from any of the four phases, as indicated at (k). This discussion likewise applies to Channel 2.

On the other hand, the carrier phase of the frequency conversion may be set to clear the crosstalk component. If the sub-carrier of the second frequency converter 4 is different by 180 degrees from the aforementioned value, the crosstalk component can be cleared by exemplifying the arithmetic circuit 5 by a subtracter to produce the standard color signal having a converted frequency. In short, the crosstalk components can be cleared by the aforementioned arithmetic operation shown in FIGS. 4A and 4B. Thus, the present invention can be applied all the color under recording/playing systems by subjecting the sub-carriers of the first and second frequency converters 3 and 4 to different phase controls.

In FIG. 1, as described above, the gain controller 6 and the circuit group (including The demodulators 7 and 8, the arithmetic circuit 9, the low-pass filter 10 and the sub-carrier generator 15) for producing control signals for the former are those for correcting the gain dispersion of the delay circuit 2 automatically. The demodulators 7 and 8 demodulate the reproduced color under signals before and after the delay, and have the same demodulation gains as those of multiplication of the sub-carriers which have their frequencies synchronized with the reproduced color under signals and which are fed from the aforementioned sub-carrier generator 15. In the demodulator 7, a demodulated signal, as indicated at E in FIG. 11, can be produced in the NTSC format of the VHS system, for example, if the phase of the sub-carrier is advanced in Channel 1 by 90 degrees for each horizontal period (1 H) and is delayed in Channel 2 by 90 degrees for each horizontal period (1 H). The demodulated signal is produced, as indicated at F, if the phase of the sub-carrier of the demodulator 8 is delayed in Channel 1 by 90 degrees from the sub-carrier phase of the demodulator 7. Here, the difference between the demodulated signals E and F resides in that the signal F is delayed by one horizontal period (1 H) from the signal E and that the amplitude level depends upon the amplitude level of the demodulated signal inputted to the demodulator.

These two demodulated signals E and F are inputted to the arithmetic circuit (e.g., a subtracter) 9 so that its difference signal is extracted. This difference signal is inputted to the low-pass filter 10. As a result, the aforementioned differential component is detected as the DC signal. The level of this DC signal is proportional for a long time period, e.g., one field to the amplitude level difference of the demodulated signals inputted to the individual demodulators. The demodulated signals inputted to the two demodulators 7 and 8 can have their amplitude levels equalized by feeding back that DC signal to the gain controller 6.

The phases of the sub-carriers may be set to equalize the amplitude levels of the demodulated signals inputted to the two demodulators 7 and 8. If the sub-carrier of the demodulator 8 is different by 180 degrees from the aforementioned value, an identical result can be obtained by exemplifying the arithmetic circuit 9 by an adder. In short, the present invention can be applied to all the color under recording/playing systems by controlling the phases of the sub-carriers of the two demodulators 7 and 8.

In FIG. 2, the gain controller 6 and the circuit group (including the demodulators 7' and 8', the arithmetic circuit 9, the low-pass filter 10 and the oscillator 17) for producing the control signals for the former are circuits for automatically correcting the gain dispersion in the delay circuit 2 and the frequency converter. Specifically, the demodulators 7' and 8' demodulate the signals of the reproduced color under signals before and after the delay into the standard color signals and the frequency-converted signals into the demodulated signals, and have equal demodulation gains with the carriers which have their frequencies and phases synchronized with those of the burst signals of the standard color signals.

With reference to FIGS. 11A–11C, the demodulated signal, as indicated at E, is obtained as that of the demodulator 7'. The demodulated signal, as indicated at F, is obtained as that of the demodulator 8'. Here, what is different between the signals E and F is that the signal F is delayed by one horizontal period (1 H) from the signal E and that the amplitude level depends upon the amplitude level of the demodulated signals inputted to the demodulators.

These two demodulated signals E and F are subtracted in the arithmetic circuit 9. The subtracted output corresponding to the difference of the aforementioned two signals is inputted to the low-pass filter 10. As a result, the aforementioned differential component signal can be detected as the DC signal. The level of this DC signal is proportional for a long time period, e.g., one field to the amplitude level difference of the demodulated signals inputted to the individual demodulators 7' and 8'. The demodulated signals inputted to the two demodulators can have their amplitude levels equalized by feeding back that DC signal to the gain controller 6.

The phases of the demodulated carriers may be set to equalize the amplitude levels of the demodulated signals inputted to the two demodulators 7' and 8'. If the sub-carrier of the demodulator 8' is different by 180 degrees from the aforementioned value, an identical result can be obtained by exemplifying the arithmetic circuit 9 by an adder. In short, the present invention can be applied to all the color under recording/playing systems by controlling the phases of the sub-carriers of the two demodulators 7' and 8'.

According to the present invention, a frequency converter capable of clearing the crosstalk components by the CCD or line memory having a low clock frequency can be provided in the color under type VTR without using either any large part having a large packaging area such as the glass delay line or the CCD having a high clock frequency and without adding any phase corrector to the color signal route or the sub-carrier route. Moreover, the frequency conversion unit, as shown in FIG. 1, can be constructed and automatically adjusted even with an element dispersion in the delay circuit of one horizontal periods (1 H) or two horizontal periods (2 H).

Figure 5:
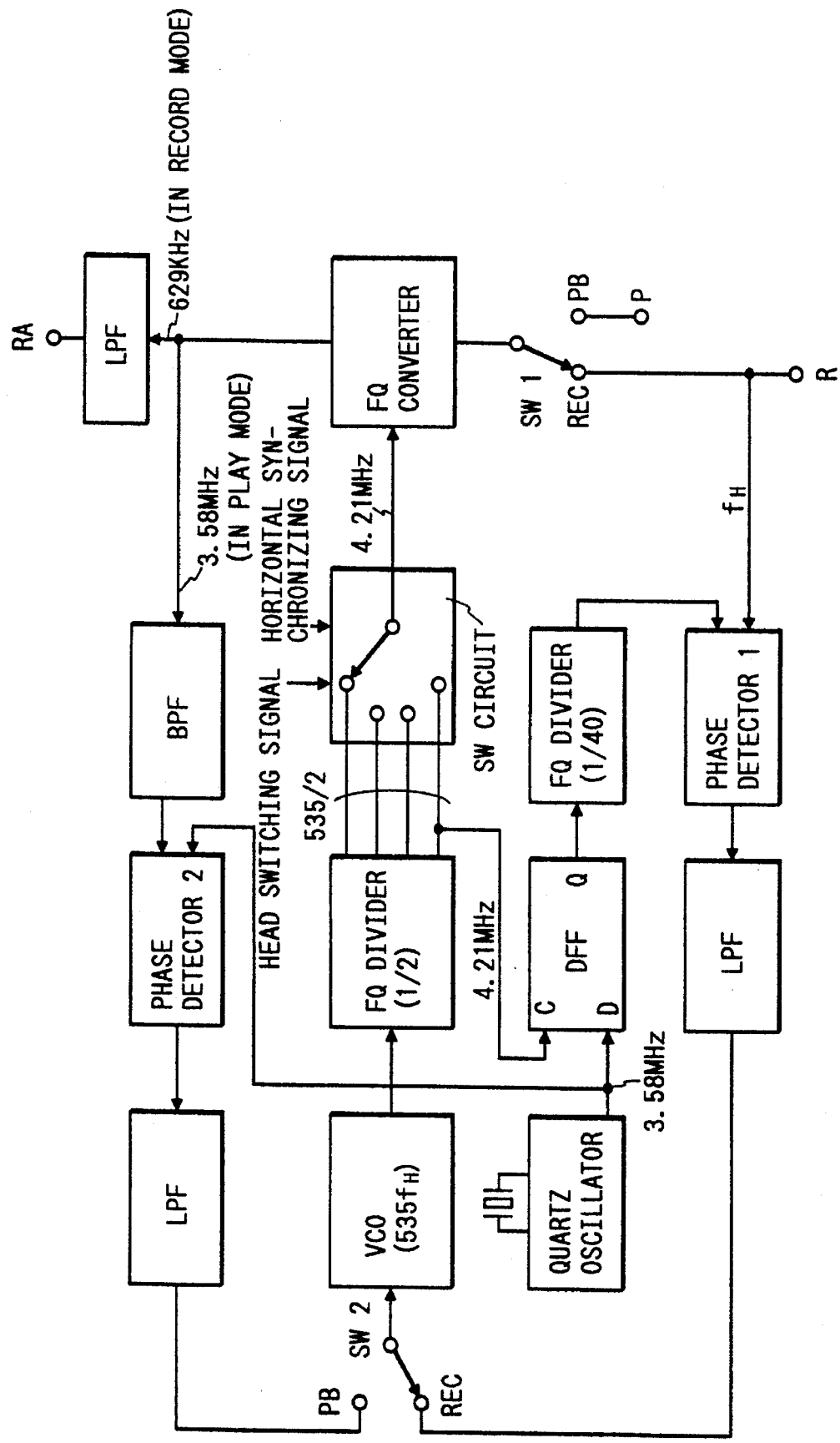
FIG. 5 is a block diagram for explaining the frequency conversion system premising the present invention.

FIG. 5 is a block diagram for explaining the frequency converting system premising the present invention. In this frequency converting system, a carrier signal frequency $f_c$ necessary for the VTR for conversion into the aforementioned 40 $f_H$ can be expressed directly by the following Equation 1, noting that a color sub-carrier frequency $f_c$ in the TV of the NTSC system is at 455 $f_H$ ($f_H$=15734.265 Hz) and that the carrier signal frequency $f_c$ is expressed by $f_{sc}$+40 $f_H$.

$$f_c = f_{sc} + 40 f_H = 455 f_H/2 + 40 f_H \quad \text{[Eq. 1]}$$
$$= 535 f_H/2.$$

A frequency, which is N times as high as that of the signal $f_c$, is produced by the voltage-control type oscillator (as will be shortly referred to as the "VCO") and is synchronized with a horizontal synchronizing signal by a PLL (i.e., Phase Locked Loop). Thus, the carrier signal $f_c$ can be produced without any high-frequency component of 40 $f_H$. and without requiring any frequency converter such as a multiplier.

The VCO is given a free-running frequency corresponding substantially to a frequency of 535 $f_H$ which is two times as high as that of the carrier signal $f_c$, although not especially limited thereto. The output signal of that VCO has its frequency halved to produce the carrier signal $f_c$ of the aforementioned frequency 535 $f_H/2$. The frequency divider used is exemplified by a through latch circuit having the ECL construction, as will be described hereinafter, to effect the aforementioned frequency division and to produce 4-phase signals having a phase difference of 90 degrees from each other.

One of the four carrier signals (having a frequency of 535 $f_H/2$=4.21 MHz) thus having been subjected to the frequency division and the phase shifting operation is selected by a switch circuit, which is switched by a head switching signal and a horizontal synchronizing signal, and is inputted to a frequency converter. The following loop is provided for synchronizing that carrier signal accurately with the horizontal synchronizing signal contained in the recorded signals.

One frequency-divided output of the aforementioned frequency divider is fed to a clock terminal C of a D-type flip-flop circuit (as will be shortly referred to as the "DFF"). This DFF has its data terminal D fed with a frequency corresponding to the color sub-carrier of about 3.58 MHz produced by a quartz oscillator. This DFF is enabled, by fetching the signal of a lower frequency of 3.58 MHz in synchronism with the rising edge of the higher frequency 4.21 MHz, as illustrated in the waveform diagram of FIGS. 8A–8C to produce a phase difference inbetween, i.e., an output signal corresponding to the frequency difference, from an output terminal Q. Specifically, the subtraction by that DFF is expressed by the following Equation 2.

$$\begin{aligned} 4.21 - 3.58 &= f_c - f_{sc} \quad \text{[Eq. 2]} \\ &= 535 f_H/2 - 455 f_H/2 \\ &= 40 f_H \; (= 0.63 \text{ MHz}). \end{aligned}$$

The aforementioned carrier signal having the frequency of 535 $f_H/2$ may be divided into 2/535 by the frequency divider. In this case, however, the frequency division of a fraction of 2/535 is required to complicate the circuit and enlarge the circuit scale. By using the aforementioned frequency subtracter using the DFF, on the contrary, the frequency divider in the PLL can be drastically simplified.

The frequency divider disposed in the aforementioned PLL performs a frequency division of 1/40 to produce a frequency signal corresponding to the horizontal synchronizing signal $f_H$. This frequency-divided output signal is fed together with the horizontal synchronizing signal $f_H$ contained in the recording signal fed from a record terminal R so that they are compared in phase. Incidentally, the aforementioned horizontal synchronizing signal $f_H$ is produced through the not-shown synchronous separator. By this phase comparison, the detected signal corresponding to the phase difference (i.e., frequency difference) is converted into a DC signal by the low-pass filter (as will be shortly referred to as the "LPF") and is fed to the control terminal of the aforementioned VCO through the switch SW2 which is connected to the recording side REC when in the recording mode. By this PLL, it is possible to produce an oscillating signal of 535 $f_H$ which is accurately synchronized with the horizontal synchronizing signal $f_H$ contained in the aforementioned video signal recorded.

The color sub-carrier in the video signal fed from the aforementioned record terminal R is inputted in the recording mode through the switch SW1 connected with the recording side REC to the frequency converter, in which it is synchronized with the aforementioned carry signal so that it is converted to have a frequency of about 629 KHz corresponding to the difference. The color signal thus having its band converted is transmitted through the LPF to an input terminal RA of the recording amplifier.

FIG. 5 also presents a reproducing signal processor. In a play mode, the frequency conversion opposed to the aforementioned one is carried out. In the play mode, the switch SW1 is connected with a play terminal PB. The frequency converter synthesizes the aforementioned carrier signal of 4.21 MHz and the band-converted color signal of about 629 KHz to convert the frequency to about 3.58 MHz corresponding to the difference. The color signal thus having the converted band has its color sub-carrier component extracted through a band-pass filter (as will be shortly referred to as the "BPF") until it is inputted to the phase detector 2.

This phase detector 2 performs a comparison of the phase with the reference frequency signal of 3.58 MHz produced by the aforementioned quartz oscillator. By this phase comparison, the detected signal corresponding to the phase difference (i.e., frequency difference) is converted into a DC signal by the LPF and is fed to the control terminal of the aforementioned VCO through the switch SW2 connected in the play mode with the play side PB. By this PLL, it is possible to produce in the play mode the oscillatory signal of 535 $f_H$ which is accurately synchronized with the standard frequency signal produced by the quartz oscillator.

Figure 6:
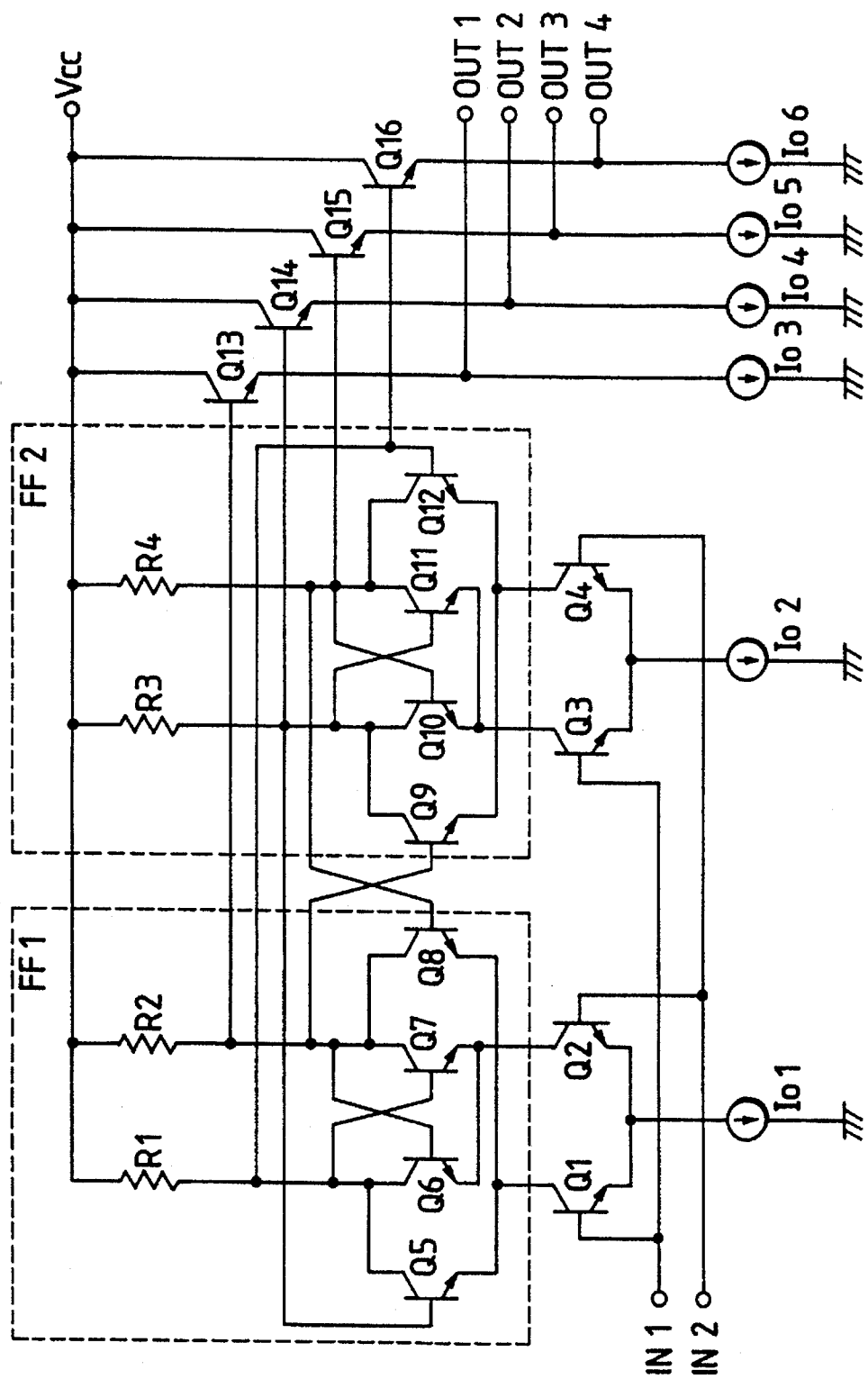
FIG. 6 is a specific circuit diagram showing one embodiment of the frequency divider for halving a frequency and for producing 4-phase signals.

FIG. 6 is a specific circuit diagram showing one embodiment of the frequency divider for producing the aforementioned ½ frequency division and 4-phase signals. In this embodiment, two through latch circuits FF1 and FF2 having the ECL construction are used to perform the ½ frequency division and produce the 4-phase output signals.

Transistors Q6 and Q7 having their collector terminals and base terminals cross-connected. The collector terminals of these first differential transistors Q6 and Q7 are individually connected commonly with the collector terminals of first input differential transistors Q5 and QS. These common collector terminals are individually equipped with load resistor elements R1 and R2. The aforementioned latch-shaped first differential transistors Q6 and Q7 and the aforementioned first input differential transistors Q5 and Q8 have their individual common emitter terminals equipped with a constant current source Io1 through second differential transistors Q1 and Q2. By these components, the first through latch circuit FF1 is constructed.

The second through latch circuit FF2 is composed, like the aforementioned first through latch circuit FF1, of latch-shaped third differential transistors Q10 and Q11, second input differential transistors Q9 and Q12, load resistor elements R3 and R4, a constant current source Io2, and fourth differential transistors Q3 and Q4.

The aforementioned first and second input differential transistors Q5 and Q8, and Q9 and Q12 of those two through latch circuits FF1 and FF2 have their base terminals fed cross with the output signals of the other through latch circuits FF2 and FF1. The base terminals of the aforementioned first and second differential transistors Q1 and Q2, and Q3 and Q4 for the current switching operations are fed in opposite phases with input signals to have their frequencies divided.

Specifically, an input terminal IN1 is connected with the base terminal of the transistor Q1, which effects a through inputting operation for the first through latch circuit FF1, and the base terminal of the transistor Q3 which latches the second through latch circuit FF2. An input terminal IN2 is connected with the base terminal of the transistor Q2, which latches the first through latch circuit FF1, and the base terminal of the transistor Q4 which effects a through inputting operation for the second through latch circuit FF2.

These input terminals IN1 and IN2 are fed with the aforementioned input signals to have their frequencies divided. When the oscillating output signal is in a double-end output mode, the input terminals IN1 and IN2 are fed with input signals in opposite phases. When the oscillating output signal is in a single-end output mode, the input terminal IN1 (or IN2) is fed with the oscillating output whereas the input terminal IN2 (or IN1) is fed with an intermediate potential of the oscillating output signal.

In this embodiment, the four signals, which are produced by the load resistors R1, R2, R3 and R4 disposed in the aforementioned two through latch circuits FF1 and FF2, are outputted as the 4-phase signals having different phases by 90 degrees through an emitter-follower circuit composed of transistors Q13, Q14, Q15 and Q16 and the constant current sources Io3, Io4, Io5 and Io6. It should be noted that the circuit symbol Io1 to Io6 of the constant current source appearing in FIG. 6 indicates not a limited supply of the same constant current but generally a constant current source.

The operations of the circuit of the embodiment will be described with reference to the waveform chart shown in FIGS. 7A–7E. In FIGS. 7A–7E, the input terminal IN1 is fed with the single-end oscillatory signal, and the input terminal IN2 is fed with the intermediate potential as the reference voltage. While the oscillatory signal fed to the input terminal IN1 is at a lower level than that of the reference intermediate potential, the transistors Q2 and Q4 are ON. With the transistor Q2 being ON, in the first through latch circuit FF1, the constant current of the constant current source Io1 is fed to the aforementioned first differential transistors Q6 and Q7 in the latch shape to latch the input signal which has been fetched before. If the transistor Q6 is ON, for example, the constant current flows to the load resistor element R1 so that a corresponding output terminal OUT4 takes a low level. When the transistor Q7 is OFF, a corresponding output terminal OUT1 takes a high level.

When the aforementioned transistor Q4 is ON, the second through latch circuit FF2 has its aforementioned second input differential transistors Q9 and Q12 turned ON. Specifically, the input transistor Q9 is turned ON in response to the output signal at the high level corresponding to the OFF state of the transistor Q7 of the first through latch circuit FF1, and the input transistor Q12 is turned OFF in response to the output signal at the low level corresponding to the ON state of the transistor Q6. As a result, the constant current flows to the load resistor element R3 to produce an output signal at the low level, but the constant current does not flow to the load resistor element R4 to produce a signal at the high level such as the power voltage Vcc. As a result, an output terminal OUT2 has an output signal at the low level, but an output terminal OUT3 takes an output signal at the high level.

When the oscillatory signal to be fed to the input terminal IN1 changes to a high level with respect to the reference intermediate voltage, the transistors Q2 and Q4 are turned OFF whereas the transistors Q1 and Q3 are turned ON. With the transistor Q3 being ON, in the second through latch circuit FF2, the constant current of the constant current source Io2 is fed to the aforementioned third differential transistors Q10 and Q11 in the latch shape to latch the input signal which has been fetched before. That is, the transistor Q10 is latched in the ON state in response to the ON state of the aforementioned input transistor Q9, but the transistor Q11 is latched in the OFF state in response to the OFF state of the input transistor Q12. As a result, the output terminal OUT2 is held in the low level whereas the output terminal OUT3 is held in the high level.

In response to the ON state of the aforementioned transistor Q1, the first through latch circuit FF1 has its aforementioned first input differential transistors Q5 and Q8 turned ON. In the second through latch circuit FF2, as described above, the input transistor Q8 is turned ON in response to the output signal at the high level corresponding to the OFF state of the transistor Q11, and the input transistor Q7 is turned OFF in response to the output signal at the low level corresponding to the ON state of the transistor Q10. As a result, the constant current flows not to the load resistor element R1 but the load resistor element R2 so that the aforementioned latched signals are inverted. Specifically, the output terminal OUT4 has its output signal switched from the low to high levels, but the output terminal OUT1 has its output signal switched from the high to low levels.

When the oscillatory signal to be fed to the input terminal IN1 changes again to the low level with respect to the reference intermediate voltage, the transistors Q1 and Q3 are turned OFF whereas the transistors Q2 and Q4 are turned ON. With the transistor Q2 being ON, in the first through latch circuit FF1, the constant current of the constant current source Io1 is fed to the aforementioned first differential transistors Q6 and Q7 to latch the input signal which has been fetched before. That is, the transistor Q7 is latched in the ON state in response to the ON state of the aforementioned input transistor Q8, but the transistor Q6 is latched in the OFF state in response to the OFF state of the input transistor Q5. As a result, the output terminal OUT4 is held in the high level whereas the output terminal OUT1 is held in the low level.

In response to the ON state of the aforementioned transistor Q4, the second through latch circuit FF2 has its input differential transistors Q9 and Q12 turned ON. In the second through latch circuit FF1, as described above, the input transistor Q12 is turned ON in response to the output signal at the high level corresponding to the OFF state of the transistor Q6, and the input transistor Q9 is turned OFF in response to the output signal at the low level corresponding to the ON state of the transistor Q7. As a result, the constant current flows not to the load resistor element R3 but the load resistor element R4 so that the aforementioned latched signals are inverted. Specifically, the output terminal OUT2 has its output signal switched from the low to high levels, but the output terminal OUT3 has its output signal switched from the high to low levels.

By repeating similar operations, it is possible to produce the output signals OUT1 to OUT4 which have a frequency two times as high as the oscillatory frequency of the input signal IN1, i.e., a halved frequency. As is apparent from FIGS. 7A–7E, moreover, the four output signals produced by the two through latch circuits FF1 and FF2 have such rises that the output signal OUT2 has its phase delayed by 90 degrees from the output signal OUT4, that the output signal OUT1 has its phase delayed by 90 degrees from the output signal OUT2, and that the output signal OUT3 has its phase delayed by 90 degrees from the output signal OUT1. By using the frequency divider constructed of the through latch circuits having such ECL construction, it is possible to realize a complex function circuit which has the frequency dividing operation and the phase shifting operation with the simple construction.

Since the four signals having their phases delayed by 90 degrees can be produced by the aforementioned frequency divider, they are selectively fed to the two frequency converters 3 and 4 in response to the reproduced color under signals inputted, so that the output signals, i.e., the A signal and the B signal can be their phases adjusted to clear the crosstalk components by the arithmetic circuit 5.

The effects to be obtained from the foregoing embodiments are as follows.

(1) The first reproduced color under signal is delayed by one or two horizontal periods (1 H or 2 H) by the delay circuit, and this delayed second reproduced color under signal and the aforementioned first reproduced color under signal have their frequencies converted individually by the first and second frequency converters into the standard color signals. The oscillatory frequency signals of 2n of the carriers for the aforementioned frequency conversions are divided to have the aforementioned carrier frequencies and to produce the four carriers having phases of 0, 90, 180 and 270 degrees. These carriers are selectively fed to the first and second frequency converters by the switches so that the two frequency-converted signals are subtracted or added in phase or in opposite phase to clear the crosstalk component from between the tracks. Thus, the reproduced color under signals are delayed to provide effects that the clock frequency of the delay circuit of the CCD or the like may be lowered and simplified, and that it is possible to automatically adjust the amplitude level difference (or gain dispersion) between the reproduced color under signal produced due to the element dispersion of the aforementioned delay circuit or the like and the delayed reproduced color under signal.

(2) By using the CCD as the delay circuit, there is obtained an effect that the circuit can be simplified.

(3) By producing the oscillatory signal having a double carrier frequency by the aforementioned oscillator and by using the frequency divider in which the two through latch circuits of the ECL construction have their inputs and outputs cross-connected, it is possible to achieve the frequency halving operation and the 4-phase signals having phases made different by 90 degrees from each other from the individual pairs of output terminals of the two through latches. As a result, there is obtained an effect that the carriers necessary for the two frequency converters for clearing the aforementioned crosstalk components can be produced by the simple construction.

(4) There is provided the D-type flip-flop circuit which has its clock terminal fed with one of the frequency-divided outputs of the aforementioned frequency divider and its data terminal fed with the color subcarrier or the frequency signal having a frequency several times as high as the former. The frequency signal having a frequency of the difference of the aforementioned two signals produced by that D-type flip-flop circuit is divided to a frequency corresponding to the horizontal synchronizing frequency. The oscillatory frequency of the aforementioned oscillator is controlled by the control voltage which is produced by making a comparison with the phase of the horizontal synchronizing signal. Thus, there is obtained an effect that a highly accurately stabilized carrier frequency can be achieved to clear the crosstalk components highly accurately.

(5) The aforementioned first reproduced color under signal and the second reproduced color under signal having passed through the gain adjuster are demodulated by the first and second demodulators made receptive of the sub-carriers, so that the aforementioned gain adjuster is controlled on the basis of the difference between the two demodulated signals. As a result, there is obtained an effect that the first and second reproduced color under signals to be fed to the first and second frequency converters can have their amplitude levels equalized automatically for the element dispersions of the delay circuit or the like.

(6) The second reproduced color under signal is fed through the gain adjuster to the second frequency converter and is demodulated by the third and fourth demodulators which are made individually receptive of the standard color signal and the color carrier produced by the aforementioned first and second frequency converters, so that the aforementioned gain adjuster is controlled on the basis of the difference between the two demodulated signals. As a result, there is obtained an effect that the amplitude level of the standard color signals produced by the first and second frequency converters for the element dispersions of the delay circuit or the frequency converter can be automatically equalized.

Although our invention has been specifically described in connection with its embodiments, it should not be limited thereto but can naturally be modified in various manners without departing from the gist thereof. For example, the semiconductor integrated circuit device constituting the signal processor for the VTR includes a circuit for processing a luminance signal. This luminance circuit will be summarized in the following. The luminance signal component is extracted by a high-pass filter and is subjected to an FM demodulation through an equalizer, a drop-out compensator, a limiter or the like to produce the luminance signal. This FM demodulated output has its signal component extracted through a low-pass filter and its band corrected by a de-emphasis, and is added to the aforementioned color signal through a noise reduction circuit until it is outputted as a video signal.

In the VTR signal processor thus far described, the color signal processor is wholly constructed of the internal circuit so that the number of external terminals is reduced while eliminating the large-sized and expensive external parts more than the case of using a glass comb filter, to reduce the size and weight of the camera-integrated VTR. Moreover, the color signal processing route can be constructed in the semiconductor integrated circuit so that a high-quality signal processing can be accomplished.

The present invention can be widely used as the color under type VTR signal processor.

What is claimed is:

1. A signal processor for a video tape recorder comprising:

a first frequency converter for converting a first reproduced color under signal having a converted frequency into a first color signal;

a delay circuit for delaying said first reproduced color under signal by one or two horizontal periods, said delay circuit including a charge coupled device;

a second frequency converter for converting a second reproduced color under signal delayed by said delay circuit into a second color signal having a converted frequency;

an oscillator for oscillating with a second carrier signal having a frequency of 2n (n: a natural number) times as high as the first frequency of a first carrier signal for the frequency conversions, and said oscillator outputting a third carrier signal having a third frequency two times as high as the first frequency of said first carrier signal;

a frequency divider for dividing the second frequency of said second carrier signal outputted from said oscillator to be equal to said first frequency, wherein said frequency divider produces four of said carrier signals having phases of 0, 90, 180, and 270 degrees from said frequency-divided first carrier signal, said frequency divider including two through latch circuits having their input terminals and output terminals cross-connected to effect a frequency halving operation of said third carrier signal and produces said four first carrier signals having phases different by 90 degrees from each other, from the individual pairs of output terminals of said two through latch circuits;

a switching circuit for selectively feeding said four first carrier signals outputted from said frequency divider to said first and second frequency converters; and, an arithmetic circuit for clearing the noise caused by a crosstalk, by subtracting or adding between the first and second color signals which are provided from the first and second frequency converters, the first and second color signals being formed on the basis of said first and second reproduced color under signals and a selected one of said four first carrier signals.

2. A signal processor for a video tape recorded comprising:

a first frequency converter for converting a first reproduced color under signal have a converted frequency into a first color signal;

a delay circuit for delaying said first reproduced color under signal by one or two horizontal periods;

a second frequency converter for converting a second reproduced color under signal delayed by said delay circuit into a second color signal having a converted frequency;

an oscillator for oscillating with a second carrier signal having a frequency of 2n (n: a natural number) times as high as the first frequency of a first carrier signal for the frequency conversions;

a frequency divider for dividing the second frequency of said second carrier signal outputted from said oscillator to be equal to said first frequency, wherein said frequency divider produces four of said carrier signals having phases of 0, 90, 180, and 270 degrees from said frequency-divided first carrier signal;

a switching circuit for selectively feeding said four first carrier signals outputted from said frequency divider to said first and second frequency converters;

an arithmetic circuit for clearing the noise caused by a crosstalk, by subtracting or adding between the first and second color signals which are provided from the first and second frequency converters, the first and second color signals being formed on the basis of said first and second reproduced color under signals and a selected one of said four first carrier signals; and, a D-type flip-flop circuit having its clock terminal fed with one of the frequency-divided outputs of said frequency divider and its data terminal fed with a first color sub-carrier signal or a second color sub-carrier signal having a frequency an integer times as high as said first color sub-carrier signal, wherein the second frequency of said second carrier signal outputted from said oscillator is controlled by a control voltage which is produced by dividing the frequency signal of the difference between said first or second color sub-carrier signal produced by said D-type flip-flop circuit and said frequency-divided output signal to a frequency corresponding to the frequency of a horizontal synchronizing signal and by making a comparison with the frequency of said horizontal synchronizing signal.

3. A signal processor for a video tape recorded comprising:

a first frequency converter for converting a first reproduced color under signal having a converted frequency into a first color signal;

a delay circuit for delaying said first reproduced color under signal by one or two horizontal periods;

a second frequency converter for converting a second reproduced color under signal delayed by said delay circuit into a second color signal having a converted frequency, said second reproduced color under signal being fed through a gain adjuster to said second frequency converter;

an oscillator for oscillating with a second carrier signal having a frequency of 2n (n: a natural number) times as high as the first frequency of a first carrier signal for the frequency conversions;

a frequency divider for dividing the second frequency of said second carrier signal outputted from said oscillator to be equal to said first frequency, wherein said frequency divider produces four of said carrier signals having phases of 0, 90, 180 and 270 degrees from said frequency-divided first carrier signal;

a switching circuit for selectively feeding said four first carrier signals outputted from said frequency divider to said first and second frequency converters;

an arithmetic circuit for clearing the noise caused by a crosstalk, by subtracting or adding between the first and second color signals which are provided from the first and second frequency converters, the first and second color signals being formed on the basis of said first and second reproduced color under signals and a selected one of said four first carrier signal; and, first and second demodulators for individually receiving said first reproduced color under signal, said second reproduced color under signal and said gain adjuster being on the basis of a difference between the first and second demodulated signals outputted from said first and second demodulators as to equalize amplitude levels of said first and second reproduced color under signals fed to said first and second frequency converters.

4. A signal processor for a video tape recorder comprising:

a first frequency converter for converting a first reproduced color under signal having a converted frequency into a first color signal;

a delay circuit for delaying said first reproduced color under signal by one or two horizontal periods;

a gain adjuster which adjusts a second reproduced color under signal;

a second frequency converter for converting said second reproduced color under signal received from the gain adjuster and delayed by said delay circuit into a second color signal having a converted frequency;

an oscillator for oscillating with a second carrier signal having a frequency of 2n (n: a natural number) times as high as the first frequency of a first carrier signal for the frequency conversions;

a frequency divider for dividing the second frequency of said second carrier signal outputted from said oscillator to be equal to said first frequency, wherein said frequency divider produces four of said carrier signals having phases of 0, 90, 180, and 270 degrees from said frequency-divided first carrier signal;

a switching circuit for selectively feeding said four first carrier signals outputted from said frequency divider to said first and second frequency converters;

an arithmetic circuit for clearing the noise caused by a crosstalk, by subtracting or adding between the first and second color signals which are provided from the first and second frequency converters, the first and second color signals being formed on the basis of said first and second reproduced color under signals and a selected one of said four first carrier signal; and, first and second demodulators for individually receiving said first and second frequency-modulated color signals outputted from said first and second frequency converters and color carrier signals, the first and second demodulators controlling said gain adjuster on the basis of a difference between the first and second demodulated signals outputted from said first and second demodulators as to equalize amplitude levels of said first and second frequency-converted color signals outputted from said first and second frequency converters.

* * * * *